Figure 1:
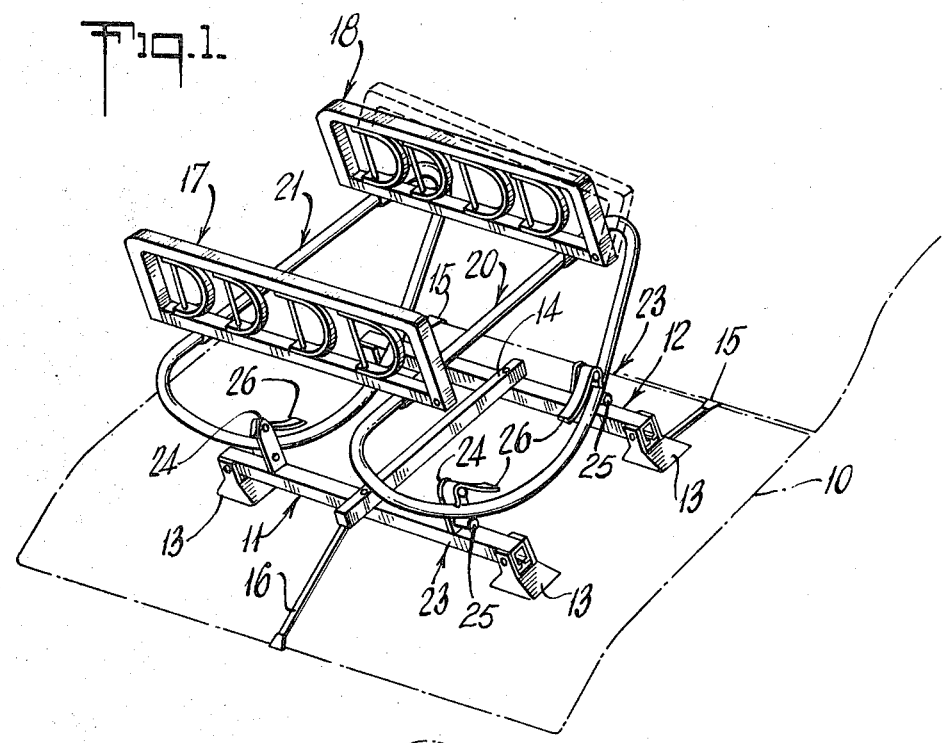

United States Patent [19]

Penniman

[11] 3,712,522
[45] Jan. 23, 1973

[54] SKI-MOUNTING RACK MEANS
[75] Inventor: Robert Penniman, Burlington, Vt.
[73] Assignee: Barreca Products Co., Subsidiary of Shelburne Industries, Inc., Shelburne, Vt.
[22] Filed: Sept. 23, 1971
[21] Appl. No.: 182,965

[52] U.S. Cl. .................................................224/29 R
[51] Int. Cl. ................................................B60r 9/04
[58] Field of Search ........224/42.1 F, 42.1 E, 42.1 D, 224/29 R

[56] References Cited

UNITED STATES PATENTS

| 3,606,111 | 9/1971 | Gjesdahl | 224/42.1 F |
|---|---|---|---|
| R27,170 | 9/1971 | Porter | 224/42.1 F X |
| 3,610,491 | 10/1971 | Bott | 224/42.1 E |

Primary Examiner—Robert G. Sheridan
Assistant Examiner—Jerold M. Forsberg
Attorney—Sandoe, Hopgood and Calimafde

[57] ABSTRACT

The invention contemplates ski-mounting means in which the plane of support of the skis can be selectively adjustably elevated, within a wide range of elevation angles. Base-frame structure is secured to a vehicle-body part, in order to provide a reference position for four bearing members, located at corners of a rectangle. A slide-frame structure includes, in addition to conventional ski-rack devices, a pair of spaced parallel generally arcuate support rails, each of which derives guided support, longitudinally of the rails, in a different two of the bearing members. Clamp means secures a selected angular adjustment of the slide rails to the bearing members.

10 Claims, 2 Drawing Figures

INVENTOR
ROBERT PENNIMAN
BY
Sandoe, Hopgood & Calimafde
ATTORNEYS

SKI-MOUNTING RACK MEANS

The invention relates to ski carriers for mounting upon a part of a vehicle body, such as the trunk lid of a passenger automobile.

Ski carriers of current design, particularly trunk-mounted carriers, are inadequate for several reasons, the primary difficult being a lack of adjustability. This problem is aggravated by the need to operate the lid, for access to the trunk while the rack is loaded with skis; in most situations, the tips of skis on the rack will interfere with the car roof if the lid is raised. Proposals have been made to incorporate a limited degree of elevating adjustment, to permit adaptation to a wider variety of car profiles, but no single carrier is even adaptable to most of the car-body shapes. Moreover, current ski racks do not lend themselves to sufficient adjustment of rack angle to achieve a ski orientation of least wind resistance, or least rear-vision obstruction.

It is, accordingly, an object of the invention to provide a improved rack construction, avoiding the above-noted deficiencies.

It is a specific object to provide a ski carrier flexibly adaptable to all vehicle trunk-lid configurations and incorporating a rack-angle adjustment feature, over a relatively great range of angles.

It is a general object to meet the foregoing objects with a construction of basic simplicity, low cost, and foolproof operation.

Figure 2:
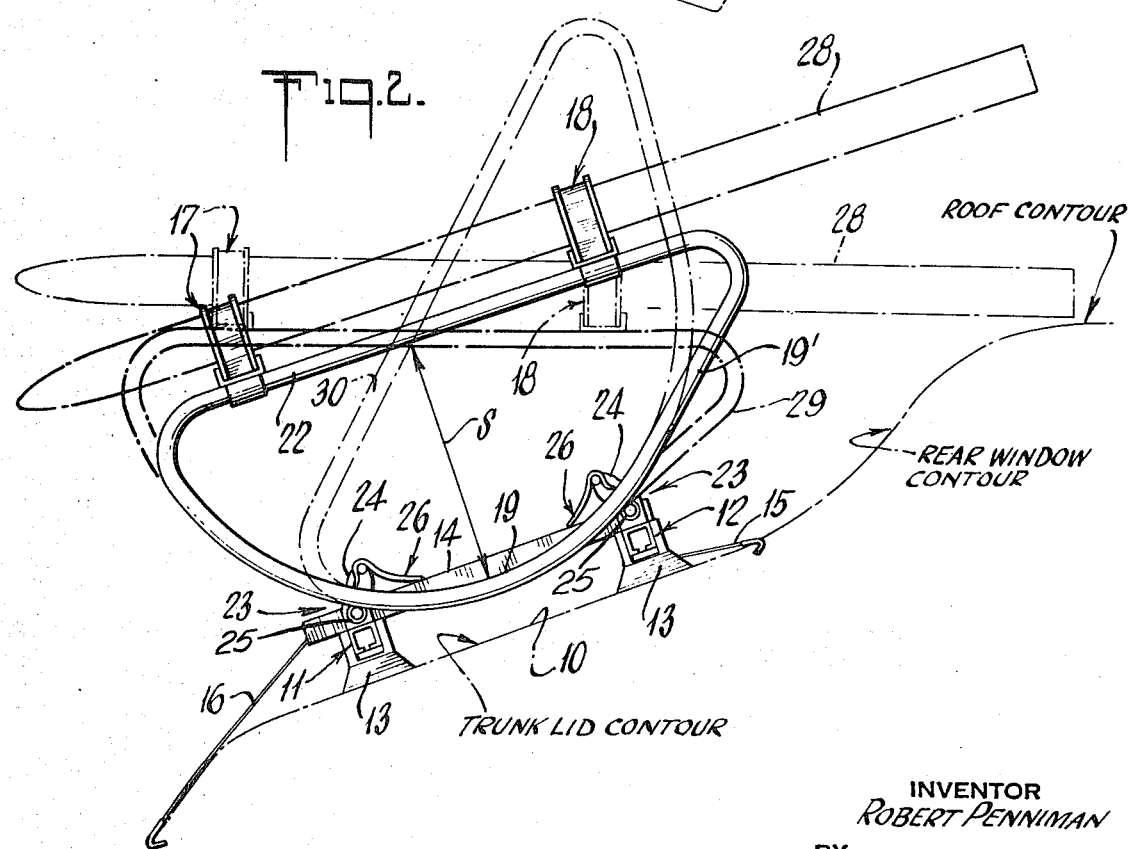

Other objects and various further features of novelty and invention will be pointed out or will occur to those skilled in the art, from a reading of the following specification, in conjunction with the accompanying drawings. In said drawings, which show, for illustrative purposes only, a preferred form of the invention:

FIG. 1 is a simplified view in perspective of ski-carrier means of the invention, with a phantom-line suggestion of an automobile trunk lid to which the carrier is mounted; and FIG. 2 is a view in elevation showing angular-adjustment features of the carrier of FIG. 1.

Referring to the drawings, the invention is shown in application to the rear trunk lid 10 of an automobile, using much structure which will be recognized as conventional. Thus, a base-frame structure is established by two spaced parallel bars 11–12, which may be aluminum extrusions; each of bars 11–12 has spaced suitably cushioned feet 13 pivotally connected at ends of the bars, for body-contour adaptability. A central tie bar 14 secures the bars 11–12 and thus unites all parts of the base-frame structure. Anchor straps 15 reference spaced parts of the forward bar 12 to the forward edge of the lid 10; similarly, a central anchor strap 16 references the center bar 14 (and, therefore, the whole base-frame structure) to the rear edge of the lid 10. Strap take-up for correctly tensed adaptation to lid 10 will be understood to follow conventional practice and therefore will not be described.

Ski-supporting rack means, comprising spaced like devices 17–18, is carried by the described base-frame structure, via an intermediate frame which has slidable engagement with the base frame and is therefore termed a slide-frame structure. The slide-frame structure features two like spaced parallel generally arcuate support rails, which are shown as corresponding arcuate stretches 19 of like framing hoops 20–21. The arcuate stretches 19 provide the lower half of each framing hoop, the hoop being completed by an upper, straight chordal stretch 22. The rack devices 17–18 extend transverse to the vehicle axis, being bolted or otherwise secured at opposite ends to the two chordal stretches 22.

In accordance with the invention, four like bearings 23 are provided on the base-frame structure for guided support of the arcuate rail stretches 19, two such bearings serving each side of slide structure. The bearings 23 are located at corners of a rectangle defined by the transverse bars 11–12, and by spaced longitudinal alignments of right and left bearings on the respective bars 10–11. As best seen in FIG. 2, each bearing 23 comprises an upstanding bracket 24 secured to one of the bars 11–12 and provided with a guide and support roller 25, which may be secured, as by a horizontal post, bolt or stud, to bracket 24. The rollers 25 carried by bar 11 are on a common axis, transverse to the vehicle axis and parallel to spaced common axis for the rollers 25 at bar 12; these rollers may be of nylon, with a grooved periphery, for better tracking of rails 19.

As shown, the brackets are located in-board of the respective rail stretches 19 and are additionally provided with manually actuable toggle-clamp mechanism 26 for securing a selected position of rail adjustment in bearings 25. Each of the toggle-clamps is shown as a bell crank, pivotally carried by its bracket 24 on the upper (concave) side of arcuate curvature of the rails 19; one arm of the bell crank is the actuator, and the other is relied upon to locally jam part of the associated rail 19 against its supporting bearing roll 25. Preferably, the actions of the toggle clamps 26 for a given 19 are in opposite directions, as shown.

Preferably, the vertical span S of the slide-frame structure elevates supported skis 28 well above the lid, (e.g., about 14 inches), to the extent that in the forwardly tipped region of tilt adjustment (suggested by phantom outline 29, in FIG. 2), the skis 28 are substantially horizontal and are positioned in relatively close proximity to the vehicle roof; this position is most suitable for driving, with minimum wind drag. For access to the contents of the trunk or for ski-loading and unloading, the clamps 26 are easily released, to permit tilting of the loaded carrier, as to the position shown in full lines, or to the extreme position suggested by phantom outline 30, depending upon car-body limitations and personal preference for convenient access to the skis; in either case, one or more of the clamps 26 are easily set to hold the temporary tilt angle.

The ski carrier shown in the drawings includes an arcuate rail stretch which is in the order of 120°; approximately one half of this extent, namely, about 60°, is accounted for by the space between support rolls 25 on the two frame bars 11–12. A 60° range of angular adjustment is thus selectively available, and any selected position can be firmly locked, the toggle clamps 26 being merely illustrative of one of various alternative techniques.

The invention will be seen to have achieved the stated objects, with an adjustable structure that lends itself to the widest possible variety of ski-clamping devices and vehicle-body configurations. By slightly modifying the rail curvature, as from purely arcuate to a lesser curvature (or even tangential) at one end 19', the effective length of the carrier mounting portions 22 of the slide-frame structure can be extended, to enable a more forward offset of the mounted skis 28 with respect to the base-frame members 11–12, as shown.

In addition to the features already discussed, it will be seen that the invention provides means whereby a loaded trunk-mounted ski carrier will not offend the recent, and more strict, rear-visibility requirements for motor-vehicle operating safety. When the carrier is adjusted for highway travel, the skis are in a generally horizontal plane and above the roof. This means that the tiltable frame is the only structure at rear-window elevation, and this structure is largely "see-through" in nature, the rail-bar hoops 20–21 being laterally spaced and in upstanding planes which establish minimum obstruction to rear vision.

While the invention has been described for the preferred form shown, it will be understood that modifications may be made without departure from the invention.

What is claimed is:

1. Vehicle-body mounting means for a ski carrier, comprising base-frame structure including spaced feet and detachable anchoring means for detachably securing said base-frame structure to a vehicle-trunk lid or like body portion, said base-frame structure including four spaced bearing members at the corners of a rectangle having sides substantially parallel to the longitudinal and transverse dimensions of the vehicle, slide-frame structure adjustably positionable on said bearing members, said slide-frame structure including two spaced parallel generally arcuate support rails oriented with their concave sides upward, one of said rails having guided support in two adjacent corner bearing members of said base-frame structure, the other of said rails having like guided support in the other two corner bearing members, means including elongated ski-supporting rack means fixedly related to said slide-frame structure, said rails being guided by said bearing members for movement along their arched longitudinal axes, and clamp means coacting between said base-frame structure and said slide-frame structure for retaining a selected guided rail position and thereby retaining a selected rack orientation.

2. Mounting means according to claim 1, in which said bearing members comprise rollers, with said rails riding said rollers.

3. Mounting means according to claim 1, in which said clamp means includes a rail-engaging element and a manually actuable member carried by said base-frame structure adjacent one of said bearing members.

4. Mounting means according to claim 3, in which said clamp means is one of four, respectively adjacent each said bearing member.

5. Mounting means according to claim 1, in which each rail is a unitary bar having a generally arcuate stretch for bearing-member guidance and a generally chordal stretch connected to said ski-supporting rack means.

6. Mounting means according to claim 5, in which said rack means comprises two spaced parallel rack members each of which spans the space between and is connected to the chordal stretches of said rails.

7. Mounting means according to claim 1, in which the effective arcuate extent of said rails exceeds a right angle, the bearing members being adapted to guide said rails for a spacing having an effective included angle which is in the order of one half said arcuate extent.

8. Mounting means according to claim 1, in which the effective arcuate extent of said rails is in the order of 120°, the bearing members being adapted to guide said rails for a spacing having an effective included angle of substantially 60°, whereby the plane of the rack means may be adjustably clamped within a 60° range of adjustment.

9. Mounting means according to claim 1, in which the arcuate extent of said support rails is sufficient to enable a selected substantially horizontal positioning of skis held in said ski-supporting rack means, said rails being in upstanding planes which are substantially parallel to the vehicle axis when the base-frame structure is secured to a vehicle-trunk lid; said slide-frame structure being of sufficient vertical extent that, when in said selected horizontal position, skis carried by said rack means are in a plane above the vehicle roof.

10. Mounting means according to claim 1, in which the arcuate extent of said support rails is sufficient to enable a selected substantially horizontal positioning of skis held in said ski-supporting rack means, said rails being in upstanding planes which are substantially parallel to the vehicle axis when the base-frame structure is secured to a vehicle-trunk lid; the rail parts of said slide-frame structure being of sufficient vertical extent that, when in said selected substantially horizontal position, said rails are substantially the only visible frame members in the normal range of elevation of a vehicle rear window.

* * * * *